US007775238B2

(12) United States Patent
Prahl et al.

(10) Patent No.: US 7,775,238 B2
(45) Date of Patent: Aug. 17, 2010

(54) VACUUM VESSEL WALL ELEMENT WITH A LINE LEADTHROUGH

(75) Inventors: Volker Prahl, Bad Schwartau (DE); Manfred Ruter, Hamburg (DE)

(73) Assignee: Deutsches Elektronen-Synchrotron Desy (DE)

( * ) Notice: Subject to any disclaimer, the term of this patent is extended or adjusted under 35 U.S.C. 154(b) by 1002 days.

(21) Appl. No.: 11/465,156

(22) Filed: Aug. 17, 2006

(65) Prior Publication Data

US 2007/0062584 A1 Mar. 22, 2007

(30) Foreign Application Priority Data

Aug. 17, 2005 (DE) .................... 10 2005 038 845

(51) Int. Cl.
*F16K 24/00* (2006.01)
(52) U.S. Cl. .................. 137/588; 137/590; 137/560; 174/17.05
(58) Field of Classification Search ............... 137/588, 137/587, 590, 560; 285/412; 220/86.1, 241; 251/144; 174/17.05, 17.07, 17.08
See application file for complete search history.

(56) References Cited

U.S. PATENT DOCUMENTS

| 3,458,081 | A | * | 7/1969 | Sherman | 220/304 |
| 3,561,794 | A | * | 2/1971 | Dobbelaere et al. | 285/52 |
| 4,117,287 | A | * | 9/1978 | Walker et al. | 200/82 R |
| 4,303,044 | A | * | 12/1981 | Kottmann | 123/65 R |
| 4,472,946 | A | * | 9/1984 | Zwick | 62/50.6 |

(Continued)

FOREIGN PATENT DOCUMENTS

CH 516755 A1 12/1971

(Continued)

OTHER PUBLICATIONS

European Patent Office Machine Translation of Description of DE 2746687.*

(Continued)

*Primary Examiner*—John Rivell
*Assistant Examiner*—Andrew J Rost
(74) *Attorney, Agent, or Firm*—Hovey Williams LLP

(57) ABSTRACT

A vacuum vessel wall element is presented and described with a fixed flange element, with a separable flange element and with a line running from the inside of the vacuum vessel to the outside, the separable flange element being separably connected to the fixed flange element, with the line being held in the separable flange element and with an annular sealing area being provided between the fixed flange element and the separable flange element. The object of providing a vacuum vessel wall element with at least one line running from the inside of the vacuum vessel to the outside, where the separable flange element is connected to the fixed flange element vacuum-tight in such a way that during installation it is not necessary to lay the part of the line that is later in the vacuum through an opening provided in the fixed flange element is achieved in that the separable flange element is arranged on the side of the wall element facing the inside of the vacuum vessel and in that a bolt connection is provided inside the annular sealing area.

17 Claims, 3 Drawing Sheets

Figure 1:
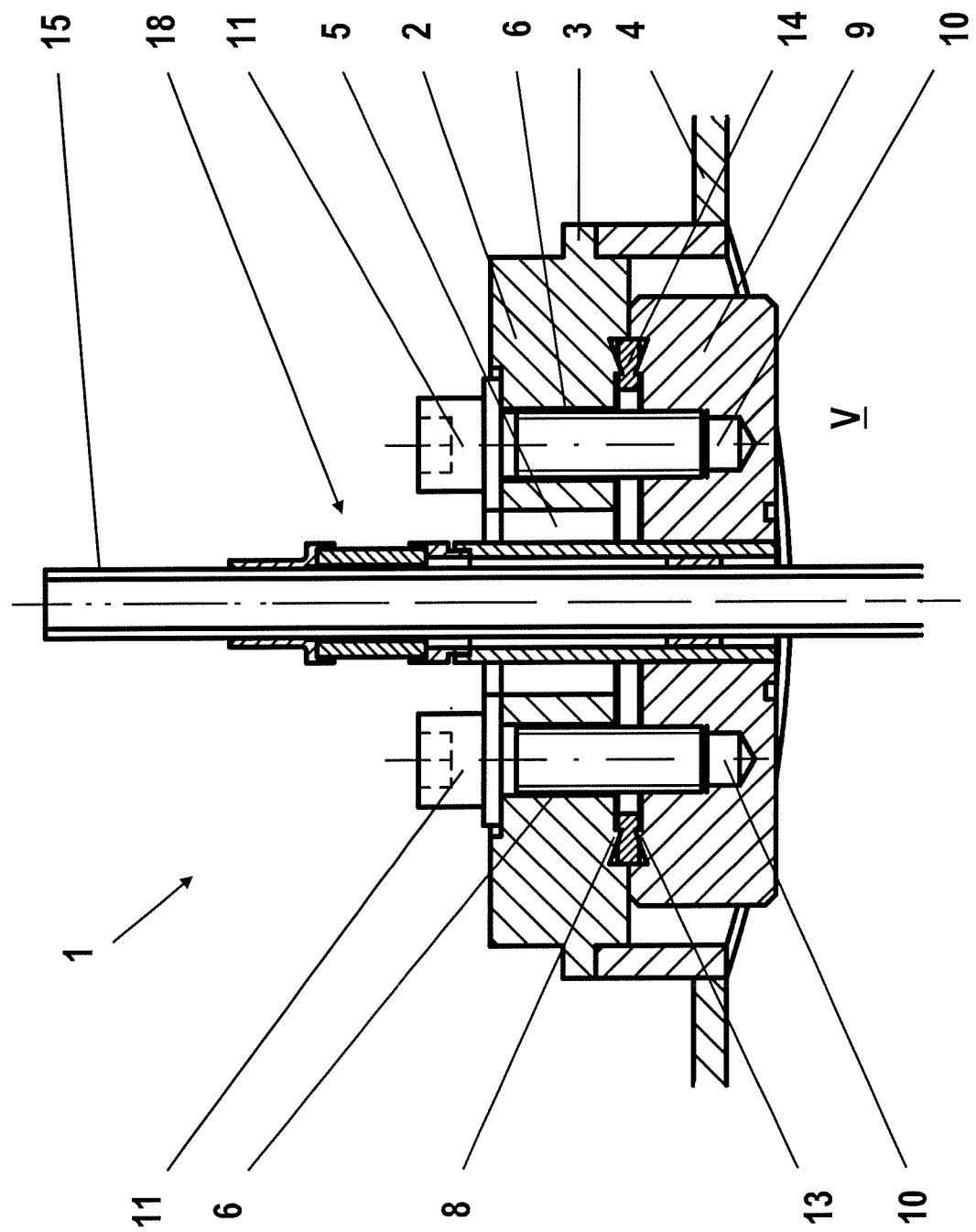

U.S. PATENT DOCUMENTS 5,285,998 A * 2/1994 Zink et al. ................. 251/144
6,100,470 A * 8/2000 Gretz ...................... 174/17.08
6,308,736 B1 * 10/2001 Lafer et al. ................. 137/590

FOREIGN PATENT DOCUMENTS

| DE | 7004376 | U1 | 8/1970 |
| DE | 2746687 | A1 | 4/1978 |
| DE | 4203334 | A1 | 8/1993 |
| JP | 2000329268 | A1 | 11/2000 |
| JP | 2002098277 | A1 | 4/2002 |

OTHER PUBLICATIONS

European Patent Office Machine Translation of Description of DE 4203334.*

Ceramaseal Catalog; p. A 48; Titled Feedthrough Instrumentation/ Power (Published 2005).

Pink Vakuumtechnik Catalog Page (Published 2006).

* cited by examiner

VACUUM VESSEL WALL ELEMENT WITH A LINE LEADTHROUGH

RELATED APPLICATION

This Application claims priority of German Application Serial No. DE 10 2005 038 845.0, filed Jun. 27, 2005, which is hereby incorporated by reference herein.

BACKGROUND OF THE INVENTION

1. Field of the Invention

The present invention relates to a vacuum vessel wall element with a fixed flange element, with a separable flange element and with a line running from the inside of the vacuum vessel to the outside, the separable flange element being separably connected to the fixed flange element, with the line being held in the separable flange element and with an annular sealing area being provided between the fixed flange element and the separable flange element.

2. Discussion of Prior Art

The term "vacuum vessel wall element" is used below to refer to the wall of a vacuum vessel or a part of the wall, but also to beamline sections and flange elements that can be flanged to a vacuum vessel or to a beamline using conventional flange connections. Furthermore, the term is used to refer to elements that can be welded into a wall of a vacuum vessel or into a beamline.

It is frequently necessary to cool aperture or target holders in accelerators or substrate holders in thin-film deposition systems inside a vacuum vessel using water or liquid nitrogen. This often results in a complicated layout of the cooling lines that exhibit large dimensions.

With conventional wall elements, provision is generally made in this context for the leadthrough of lines into a vacuum vessel for the flange element with the lines to be connected to the wall element on the side furthest from the vacuum. This means that during installation, the lines first have to be guided through an opening provided in the wall element and then connected to the apertures, target holders or substrate holders, as the spatial dimensions of the cooling line guide are larger than the opening provided in the wall element.

This type of procedure is often associated, however, with the disadvantage that the connections of the lines made after guiding the lines into the vacuum vessel are frequently the cause of leaks with the consequence that a satisfactory vacuum cannot be achieved in the vessel. It is therefore desirable that having to make connections for lines inside the vacuum vessel is avoided when installing a cooling system in a vacuum vessel. A comparable problem also occurs with electric leads, since electrical connections give off gases and can thus impair the vacuum.

SUMMARY OF THE INVENTION

The object of the present invention is therefore to provide a vacuum vessel wall element with at least one line running from the inside of the vacuum vessel to the outside, where the separable flange element with the line is connected to the fixed flange element vacuum-tight in such a way that during installation it is not necessary to lay the part of the line that is later in the vacuum through an opening provided in the fixed flange element.

This object is achieved according to the invention in that the separable flange element is arranged on the side of the wall element facing the inside of the vacuum vessel and in that a bolt connection is provided inside the annular sealing area.

With the arrangement according to the invention with the separable flange element connected separably to the side of the fixed flange element facing the inside of the vacuum vessel it is possible to attach the separable flange element with the lines from the inside of the vessel to the wall element. It is therefore not necessary to have to thread the lines that are later inside the vacuum vessel through a comparatively small opening in the wall element. It is merely necessary to thread the connections of the lines that are later on the outside through an opening provided in the fixed flange element.

The location of the bolt connection inside the annular sealing area allows the separable flange element to be connected vacuum-tight to the fixed flange element, where an annular seal can be additionally arranged in the sealing area.

With the wall element according to the invention it is thus possible to install a cooling line arrangement of comparatively large dimensions inside a vacuum vessel without the need to make new connections during installation in that area of the cooling line that is later inside the vacuum vessel.

In a preferred embodiment, the bolt connection provided inside the annular area has a number of bores running through the fixed flange element and a number of tapped blind holes aligned therewith provided in the separable flange element. Bolts can thus be inserted into the tapped blind holes from the outside and the separable flange element drawn against the inside of the fixed flange element by tightening the bolts from the outside.

It is further preferred that the annular sealing area of the two flange elements each exhibit continuous cutting edges facing once another so that a copper ring or a plastic ring can be arranged between the cutting edges into which these cut during tightening, resulting in a reliable seal.

As an alternative to the continuous cutting edges, sealing surfaces facing one another can be provided in the sealing area between which a metal ring can be inserted that serves as a seal when the bolts are tightened.

In order to connect the line provided in the separable flange element it is furthermore preferred if the fixed flange element comprises a recess inside the annular sealing area.

For connection to a vacuum vessel it is furthermore preferred if the fixed flange element also comprises an outer flange connection in addition to the bolt connection for the separable flange element by means of which the fixed flange element can be attached to a vessel wall, where the outer flange connection can be conventional CF-flange connections.

In a further preferred embodiment, the line provided in the separable flange element is designed as a fluid line, for example for a coolant. Here it is further preferred if this fluid line is electrically insulated from the separable flange element so that no electromagnetic interference fields are transmitted from the vacuum vessel wall to the equipment in the vacuum vessel connected to the fluid lines.

In the case of fluid lines it is furthermore preferred if an additional second fluid line is provided in the separable flange element, with one of the fluid lines serving as a supply line and the second serving as a drain line, and the supply line and drain line are configured inside the vacuum vessel as a closed-circuit ring main. This furthermore ensures that no additional connections are necessary within the line configuration during installation inside the vacuum vessel.

As an alternative to fluid lines, the line can also be an electrical line with which the problem also arises that reliable contacts made only during installation in the later vacuum area can later emit gases and lead to a deterioration of the vacuum.

Other aspects and advantages of the present invention will be apparent from the following detailed description of the preferred embodiments and the accompanying drawing figures.

BRIEF DESCRIPTION OF THE DRAWING FIGURES

Figure 2:
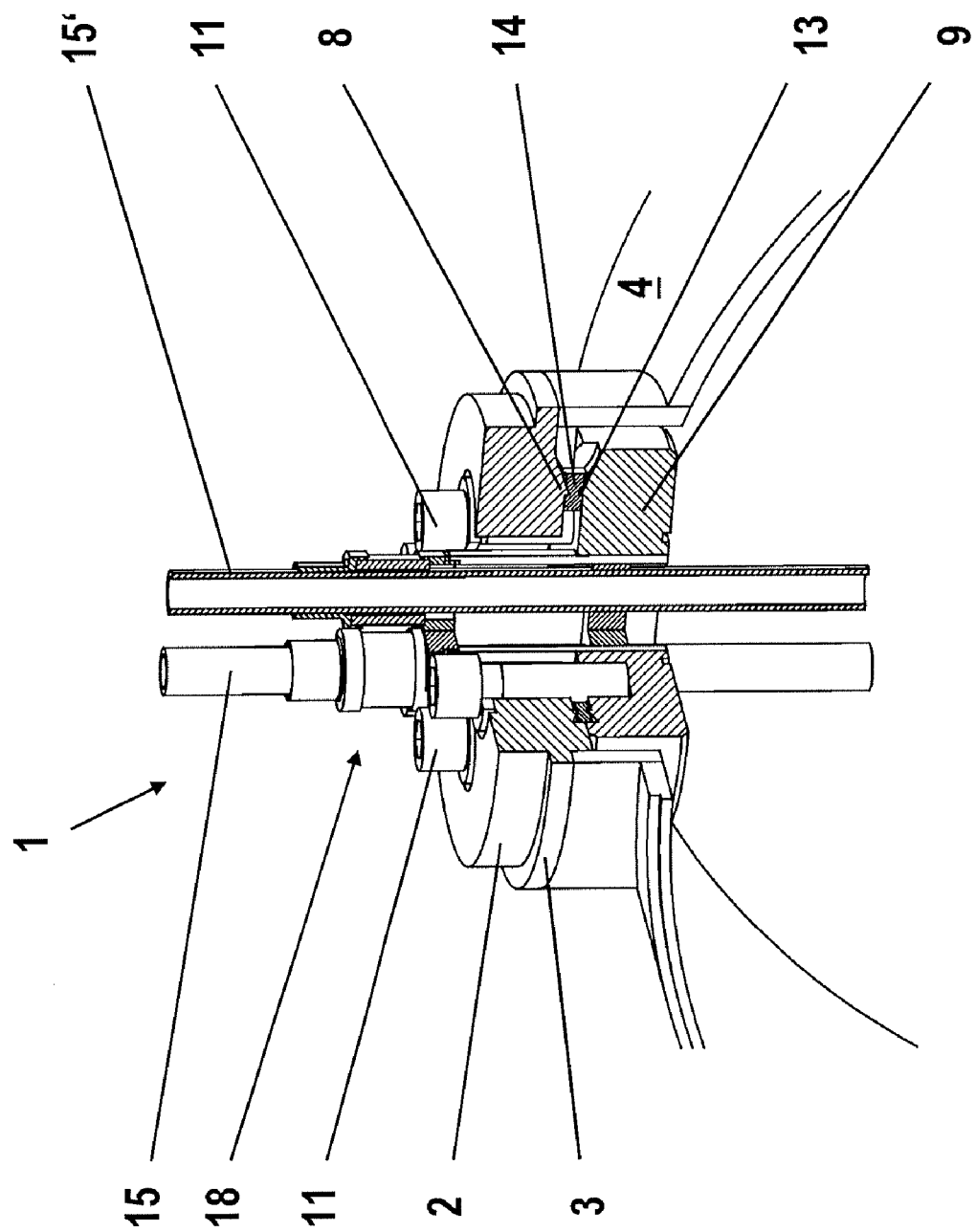
Figure 3:
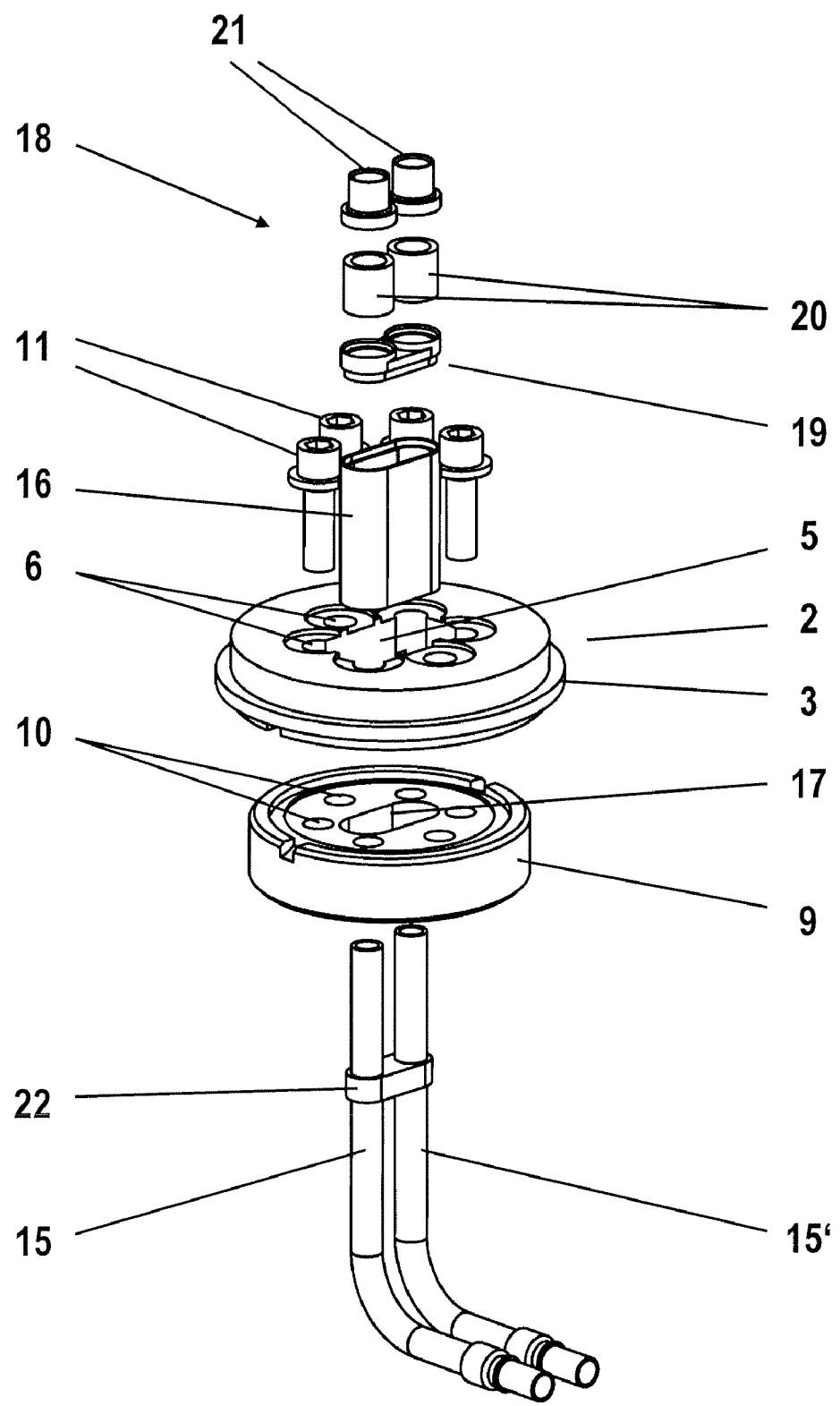

Preferred embodiments of the invention are described in detail below with reference to the attached drawing figures, wherein:

FIG. 1 shows a cross-sectional view of an embodiment of a vacuum vessel wall element according to the invention, FIG. 2 shows the embodiment according to FIG. 1 in an isometric projection, and FIG. 3 shows the embodiment according to FIG. 1 in an exploded view.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

As can be seen from FIGS. 1 and 2, the embodiment of a vacuum vessel wall element 1 according to the invention exhibits a fixed flange element 2 that is welded to one wall 4 of a vacuum vessel (not illustrated in any more detail) via a continuous ring 3. Instead of a welded connection as in the present embodiment, an external flange connection (not illustrated) can also be provided on the fixed flange element 2 for connection of the fixed flange element 2 to the wall 4, with which flange connection said flange element 2 is bolted to a flange connection provided on the vacuum vessel. This connection can be in particular a conventional CF flange connection.

The fixed flange element 2 comprises a central recess 5 that is surrounded by six through-bores 6. Furthermore, the fixed flange element 2 comprises an annular sealing area with a continuous cutting edge 8 that surrounds the through-bores 6 so that they are arranged inside the annular sealing area.

The vacuum vessel wall element 1 exhibits furthermore on the side facing the inside V of the vacuum vessel a separable flange element 9 that is separably connected to the fixed flange element 2. For this, the separable flange element 9 comprises six tapped blind holes 10 aligned with the through-bores 6 and extending from the surface of the separable flange element 9 facing the fixed flange element 2. As a result, bolts 11 can be inserted through the through-bores 6 into the tapped blind holes 10 from the sides of the vacuum vessel wall element 1 facing away from the inside V of the vacuum vessel so that the separable flange element 9 is drawn against the fixed flange element 2.

The separable flange element 9 is provided with a second continuous cutting edge 13 in the annular sealing area. A seal 14 is provided between the continuous cutting edges 8, 13 that can take the form of either a plastic gasket or a copper gasket.

As an alternative to the configuration with continuous cutting edges 8, 13 it is also conceivable that the fixed flange element 2 comprises a first sealing surface and the separable flange element 9 a second sealing surface in the sealing area, that the sealing surfaces face one another and run parallel to one another. In this case a metal ring can be placed between the sealing surfaces that is deformed when the bolts 11 are tightened.

In this thus preferred embodiment, two fluid lines 15, 15' are held in the separable flange element 9 and are guided through the recess 5 in the fixed flange element 2, said fluid lines 15, 15' being electrically insulated from the separable flange element 9. The exact design of the insulating mounting of the lines 15, 15' will be explained in further detail below by reference to FIG. 3.

In the inside V of the vacuum vessel the fluid lines 15, 15' are preferably connected to form a closed-circuit ring main, with a first fluid line 15 forming the supply line and the second fluid line 15' forming the drain line. The ring main thus formed can serve to cool a component installed in the inside V of the vacuum vessel, such as an aperture, target holder or substrate holder.

It is alternatively also feasible that electrical lines are held in the separable flange element 9 instead of the fluid lines 15, 15'.

The mounting of the fluid lines 15, 15' in the separable flange element 9 is explained in further detail below by reference to FIG. 3. In the separable flange element 9, a retaining tube 16 for the fluid line 15, 15' is welded into an opening 17 provided in the separable flange element 9. Attached to the side of the retaining tube 16 facing away from the inside V of the vacuum vessel is an insulating element 18 comprising a sealing element 19, insulating bushes 20 and rings 21.

Alternatively it is also feasible that two openings are provided in the separable flange element 9 into which sealing elements with bores for the fluid lines 15, 15' are inserted.

The insulating bushes 20 are located between the sealing element 19 and the rings 21 and in each case joined to these. The sealing element 19 in turn is connected to the retaining tube 16 by brazing.

The insulating bushes 20 are made of a ceramic material so that the sealing element 19 and the rings 21 are electrically insulated from one another. The ends of the insulating bushes 20 are metallized in order to permit the joint with the sealing element 19 and the rings 21. The fluid lines 15, 15' in turn are fastened to the rings 21 by brazing and also electrically insulated from the retaining tube 16 and the separable flange element 9. In order to stabilize the fluid lines 15, 15' in relation to the retaining tube 16, a stabilizing bush 22 is inserted into the retaining tube 16, said stabilizing bush 22 being made of an electrically insulating material and preferably of a ceramic material.

By contrast with the prior art, the separable flange element 9 with the fluid lines 15, 15' can be connected to the fixed flange element 2 from the side facing the inside V of the vacuum vessel with the vacuum vessel wall element 1 according to the invention. A component located inside the vacuum vessel with fluid lines 15, 15' can thus be installed in the vacuum vessel firstly through a large opening provided therein. The connection element with the separable flange element 9 for the fluid lines 15, 15' can then be connected to the fixed flange element 2 from the inside V of the vacuum vessel with a gasket 14 being placed into the annular sealing area between the cutting edges 8, 13. In this case, the fluid lines 15, 15' are guided through the recess 5 provided in the fixed flange element 2, and bolts 11 are then inserted through the bores 6 into the tapped blind hole 10 so that a seal is created between the inside V and the outside of the vacuum vessel.

Finally the fluid lines 15, 15' outside the vacuum vessel must be connected to supply lines and drain lines for a coolant. Possible leaks at these connections must not have any influence on the vacuum inside the vacuum vessel. The wall element 1 according to the invention thus prevents line connections having to be made in the inside V of the vacuum vessel during installation.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A vacuum vessel including a wall portion and a vacuum vessel wall element said vacuum vessel wall element comprising:
    a fixed flange element secured to the wall portion;
    a separable flange element;
    a line configured to run from the inside of the vacuum vessel to the outside,
    said separable flange element being separably connected to the fixed flange element, with the line being held in the separable flange element; and
    an annular sealing area being provided between the fixed flange element and the separable flange element,
    said separable flange element being arranged on the side of the fixed flange element facing the inside of the vacuum vessel such that at least a portion of the separable flange element is disposed within the vacuum vessel, with a bolt connection being provided inside the annular sealing area.

2. The vacuum vessel according to claim 1,
    said bolt connection having a number of bores running through the fixed flange element; and
    a number of tapped blind holes aligned therewith provided in the separable flange element,
    said tapped blind holes extending from the surface of the separable flange element facing the fixed flange element.

3. The vacuum vessel according to claim 2,
    said fixed flange element presenting a first continuous cutting edge and said separable flange element presenting a second continuous cutting edge, wherein the cutting edges face one another.

4. The vacuum vessel according to claim 2, said fixed flange element defining a recess inside the annular sealing area.

5. The vacuum vessel according to claim 2, said line being a fluid line.

6. The vacuum vessel according to claim 2, said line being an electrical line.

7. The vacuum vessel according to claim 1,
    said fixed flange element presenting a first continuous cutting edge and said separable flange element presenting a second continuous cutting edge, wherein the cutting edges face one another.

8. The vacuum vessel according to claim 7, said fixed flange element defining a recess inside the annular sealing area.

9. The vacuum vessel according to claim 7, said line being a fluid line.

10. The vacuum vessel according to claim 7, said line being an electrical line.

11. The vacuum vessel according to claim 1, said fixed flange element defining a recess inside the annular sealing area.

12. The vacuum vessel according to claim 11, said line being a fluid line.

13. The vacuum vessel according to claim 11, said line being an electrical line.

14. The vacuum vessel according to claim 1, said line being a fluid line.

15. The vacuum vessel according to claim 14, said fluid line being electrically insulated from the separable flange element.

16. The vacuum vessel according to claim 14; and
    a second fluid line held in the separable flange element,
    said first fluid line and said second fluid line being joined on the side of the wall element facing the inside of the vacuum vessel to form a closed-circuit ring main.

17. The vacuum vessel according to claim 1, said line being an electrical line.

* * * * *